US010760035B2

(12) United States Patent
Hellmuth et al.

(10) Patent No.: US 10,760,035 B2
(45) Date of Patent: Sep. 1, 2020

(54) DETERGENTS AND CLEANING PRODUCTS CONTAINING A POLYMER ACTIVE INGREDIENT

(71) Applicants: Henkel AG & Co. KGaA, Duesseldorf (DE); Fraunhofer Gesellschaft zur Foerderung der angewandten Forschung e.V., Munich (DE)

(72) Inventors: Hendrik Hellmuth, Darmstadt (DE); Benoit Luneau, Ratingen (DE); Nicole Bode, Duesseldorf (DE); Alexander Schulz, Duesseldorf (DE); Andreas Buhl, Langenfeld (DE); Yvonne Willemsen, Korschenbroich (DE); Andre Laschewsky, Potsdam (DE); Erik Wischerhoff, Potsdam (DE); Michael Paech, Potsdam (DE)

(73) Assignees: Fraunhofer Gesellschaft zur Förderung der angewandten Forschung e.V. (DE); Henkel AG & Co. KGaA (DE)

( * ) Notice: Subject to any disclaimer, the term of this patent is extended or adjusted under 35 U.S.C. 154(b) by 0 days.

(21) Appl. No.: 15/727,703

(22) Filed: Oct. 9, 2017

(65) Prior Publication Data

US 2018/0030380 A1 Feb. 1, 2018

Related U.S. Application Data

(63) Continuation of application No. PCT/EP2016/056986, filed on Mar. 31, 2016.

(30) Foreign Application Priority Data

Apr. 10, 2015 (DE) ........................ 10 2015 004 399

(51) Int. Cl.

| | |
|---|---|
| ***C11D 1/22*** | (2006.01) |
| ***C11D 3/37*** | (2006.01) |
| ***B08B 3/04*** | (2006.01) |
| ***C08F 220/18*** | (2006.01) |
| ***C11D 3/34*** | (2006.01) |
| ***C11D 11/00*** | (2006.01) |

(52) U.S. Cl.

CPC .......... *C11D 3/3418* (2013.01); *C08F 220/18* (2013.01); *C11D 1/22* (2013.01); *C11D 3/378* (2013.01); *C11D 3/3769* (2013.01); *C11D 11/0017* (2013.01); *C11D 11/0023* (2013.01)

(58) Field of Classification Search

CPC ......... C11D 1/22; C11D 3/3769; C11D 3/378; B08B 3/04; C08F 220/18

See application file for complete search history.

(56) References Cited

U.S. PATENT DOCUMENTS

| | | | | |
|---|---|---|---|---|
| 3,671,502 A * | 6/1972 | Samour | C08F 220/28 | 526/212 |
| 2003/0109413 A1* | 6/2003 | Geffroy | C11D 3/0036 | 510/475 |
| 2009/0197791 A1 | 8/2009 | Balastre et al. | | |
| 2010/0210724 A1* | 8/2010 | Cadix | A61K 8/044 | 514/556 |

FOREIGN PATENT DOCUMENTS

| | | |
|---|---|---|
| EP | 3 164 514 A1 | 12/1985 |
| EP | 2 272 942 A1 | 1/2011 |
| WO | 97/34947 A1 | 9/1997 |
| WO | 00/56849 A1 | 9/2000 |
| WO | 01/57171 A1 | 8/2001 |
| WO | 03/054044 A2 | 7/2003 |
| WO | 03/066791 A1 | 8/2003 |

OTHER PUBLICATIONS

PCT International Search Report PCT/EP2016/056986 Completed: Jun. 1, 2016; dated Jun. 17, 2016 4 pages.

* cited by examiner

*Primary Examiner* — Brian P Mruk

(74) *Attorney, Agent, or Firm* — Thomas G. Krivulka

(57) ABSTRACT

The aim of the invention is to improve the primary detergent power of detergents and cleaning products, in particular with respect to soiling containing oil and/or grease. For this purpose, copolymers including ethylenically unsaturated carboxylic acid-derived sulfobetaine units and hydroxyalkyl (meth)acrylic acid esters are incorporated into the products.

5 Claims, No Drawings

DETERGENTS AND CLEANING PRODUCTS CONTAINING A POLYMER ACTIVE INGREDIENT

FIELD OF THE INVENTION

The present invention relates to the use of particular betaine unit-containing polymers for enhancing the primary detergent power of detergents or cleaning products when washing textiles or cleaning hard surfaces, in particular with respect to soiling containing oil and/or grease, and to detergents and cleaning products containing such polymers.

BACKGROUND OF THE INVENTION

Besides the ingredients indispensable for the washing process, such as surfactants and builder materials, detergents generally contain further constituents which can be grouped together under the term washing auxiliaries and which include different groups of active ingredients such as foam regulators, antiredeposition agents, bleaching agents, bleach activators and dye transfer inhibitors. Such auxiliaries also include substances which, if present, enhance the detergent power of surfactants without generally themselves having to exhibit a pronounced surfactant behavior. The same also applies to cleaning products for hard surfaces. Such substances are often referred to as detergent power enhancers or, due to the particularly pronounced effect thereof with respect to oil-based or grease-based soiling, as "fat boosters".

International patent application WO 01/57171 A1 discloses detergents or rinsing products which, besides surfactant, contain copolymers of anionic and cationic monomers and optionally in addition nonionic monomers.

International patent application WO 00/56849 A1 discloses the color- and shape-retaining effect of cationically charged polymers when washing textiles.

The soil release effect of block copolymers of ethylenically unsaturated monomers and alkylene oxides, alkylene glycols or cyclic ethers is known from international patent application WO 03/054044 A2.

International patent application WO 03/066791 A1 describes polymers which are associated with substrate surfaces and which consist of at least 1 mol % of monomers containing amide groups.

It has surprisingly been found that polymers comprising sulfobetaine units derived from ethylenically unsaturated carboxylic acids have particularly good properties which enhance the primary detergent power.

BRIEF SUMMARY OF THE INVENTION

One subject matter of the invention is the use of polymers obtainable by copolymerization of (A) at least one hydroxyalkyl acrylic acid ester and/or hydroxyalkyl methacrylic acid ester with (B) at least one ester of general formula (I)

(I)

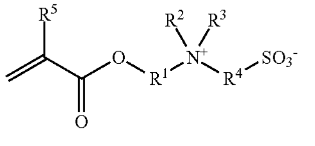

in which $R^1$ and $R^2$, independently of one another, are each a linear or branched alkylene group having 1 to 6 C atoms, $R^3$ and $R^4$, independently of one another, are each a linear or branched alkyl group having 1 to 6 C atoms, and $R^5$ is H or a methyl group, for enhancing the primary detergent power of detergents or cleaning products when washing textiles or when cleaning hard surfaces with respect to soiling which in particular contains oil and/or grease.

The polymers essential to the invention are obtainable by radical copolymerization of (A) hydroxyalkyl acrylic and/or methacrylic acid esters with (B) ethylenically unsaturated acid esters of alcohols carrying sulfoalkylammonium betaine units, which can be carried out as a block copolymerization or preferably as a random copolymerization. They contain no other units besides the units A and B, it being possible for units originating from the radical initiator to be present at the polymer ends as a result of the preparation.

In the polymer essential to the invention, the units A and B are preferably present in molar ratios in the range from 1:99 to 99:1, in particular from 75:25 to 25:75, and particularly preferably around 50:50. The polymer active ingredient preferably has an average molecular weight (here and in the text below, specified average molecular weights are number-average molecular weights) in the range from 1000 g/mol to 300,000 g/mol, in particular from 2000 g/mol to 100,000 g/mol.

The preferred hydroxyalkyl esters (A) include hydroxymethyl acrylate, 2-hydroxyethyl acrylate, 2-hydroxypropyl acrylate, 3-hydroxypropyl acrylate, 2-hydroxybutyl acrylate, 4-hydroxybutyl acrylate, 6-hydroxyhexyl acrylate, 2-hydroxy-1-methylethyl acrylate, 1-hydroxyethyl acrylate, 1,2-dihydroxyethyl acrylate, hydroxymethyl methacrylate, 2-hydroxyethyl methacrylate, 2-hydroxypropyl methacrylate, 3-hydroxypropyl methacrylate, 2-hydroxybutyl methacrylate, 4-hydroxybutyl methacrylate, 6-hydroxyhexyl methacrylate, 2-hydroxy-1-methylethyl methacrylate, 1-hydroxyethyl methacrylate, 1,2-dihydroxyethyl methacrylate, and mixtures of at least two of said compounds. The hydroxyalkyl esters (A) are preferably esters of methacrylic acid, particular preference being given to 2-hydroxyethyl methacrylate, alone or in said mixtures.

In the compounds of general formula (I), $R^5$ is preferably a methyl group. The preferred ethylenically unsaturated acid esters of alcohols carrying sulfoalkylammonium betaine units (B) include N-(2-(methacryloxyethyl)-N,N-dimethyl-N-(3-sulfopropyl)ammonium betaine.

When a polymer essential to the invention is introduced into water together with linear alkylbenzene sulfonate, an increase in the surface tension in the presence of the polymer compared to the same concentration of the surfactant in the absence of the polymer is observed in the region of the critical micelle concentration (of approx. 0.1 g/1). Without wishing to be bound by this theory, this allows the assumption that, in the presence of the polymer, due to the formation of a cleaning-active surfactant-polymer aggregate, more surfactant is present in the solution and thus less surfactant is present at the water/air interface, and thus the surface tension Increases. A further subject matter of the invention is therefore the use of a combination of polymers consisting of the aforementioned units A and B and alkylbenzene sulfonate having linear $C_{7-15}$ alkyl groups, in particular linear $C_{9-13}$ alkyl groups, for enhancing the primary detergent power of detergents or cleaning products when washing textiles or when cleaning hard surfaces with respect to soiling which in particular contains oil and/or grease. The alkylbenzene sulfonates have counter-cations from the group consisting of alkali metal ions and/or ammonium ions, preference being given to sodium, potassium, $NH_4^+$ and/or $N(R^1)_4^+$ ions where $R^1$=hydrogen, $C_{1-4}$ alkyl and/or $C_{2-4}$ hydroxyalkyl. In these combinations, the weight ratio of linear alkylbenzene sulfonate to polymer essential to the invention is preferably in the range from 20:1 to 1:1, in particular from 8:1 to 2:1.

The use of the active ingredient used according to the invention leads to a significantly better dissolution of in particular grease and cosmetic soiling on hard surfaces and on textiles, including those made of cotton or containing cotton, than is the case when using compounds known hitherto for this purpose. Alternatively, significant amounts of surfactant can be saved while keeping the grease-dissolving capability the same.

The use according to the invention may take place in the context of a washing or cleaning process such that the polymer essential to the invention is added to an aqueous liquor containing detergent or cleaning product or is preferably introduced into the liquor as a constituent of a detergent or cleaning product, wherein the concentration of the active ingredient in the liquor is preferably in the range from 0.01 g/l to 0.5 g/l, in particular from 0.02 g/l to 0.2 g/l.

A further subject matter of the invention is a method for removing soiling, in particular soiling containing oil and/or grease, from textiles or hard surfaces by bringing the textile or the hard surface into contact with an aqueous liquor, in which method use is made of a detergent or cleaning product and an aforementioned polymer active ingredient. This method may be carried out manually or by a machine, for example by means of a domestic washing machine or dishwasher. It is possible to apply the detergent or cleaning product, which in particular is in liquid form, and the active ingredient simultaneously or successively. Simultaneous application can be carried out with particular advantage by using a product which contains the active ingredient.

A further subject matter of the invention is therefore a detergent or cleaning product containing a polymer consisting of the aforementioned units A and B.

Detergents or cleaning products which contain an active ingredient to be used according to the invention or which are used together therewith or which are used in the method according to the invention may contain all the usual other constituents of such products which do not interact undesirably with the active ingredient essential to the invention. Preferably, a polymer active ingredient as defined above is incorporated in detergents or cleaning products in amounts of 0.1% by weight to 10% by weight, in particular 0.5% by weight to 2% by weight.

A product which contains an active ingredient to be used according to the invention or which is used together therewith or which is used in the method according to the invention preferably contains synthetic anionic surfactant of the sulfate and/or sulfonate type, in particular alkylbenzene sulfonate, fatty alkyl sulfate, fatty alkyl ether sulfate, alkyl and/or dialkyl sulfosuccinate, sulfo fatty acid esters and/or sulfo fatty acid disalts, in particular in an amount in the range from 2% by weight to 25% by weight and particularly preferably from 5% by weight to 15% by weight. The anionic surfactant is preferably selected from alkylbenzene sulfonates, alkyl or alkenyl sulfates and/or alkyl or alkenyl ether sulfates in which the alkyl or alkenyl group has 8 to 22 C atoms, in particular 12 to 18 C atoms. These are usually not individual substances, but rather cuts or mixtures. Among these, preference is given to those in which the proportion of compounds having longer-chain radicals in the range from 16 to 18 C atoms is above 20% by weight. Particular preference is given to the presence of the aforementioned combination of polymer essential to the invention and alkylbenzene sulfonate having linear $C_{9-13}$ alkyl groups in the products.

DETAILED DESCRIPTION OF THE INVENTION

A further embodiment of such products comprises the presence of nonionic surfactant selected from fatty alkylpolyglycosides, fatty alkylpolyalkoxylates, in particular -ethoxylates and/or -propoxylates, fatty acid polyhydroxyamides and/or ethoxylation and/or propoxylation products of fatty alkylamines, vicinal diols, fatty acid alkyl esters and/or fatty acid amides, and mixtures thereof, in particular in an amount in the range from 2% by weight to 25% by weight.

Suitable nonionic surfactants include the alkoxylates, in particular the ethoxylates and/or propoxylates, of saturated or mono- to polyunsaturated linear or branched-chain alcohols having 10 to 22 C atoms, preferably 12 to 18 C atoms. The degree of alkoxylation of the alcohols is generally between 1 and 20, preferably between 3 and 10. They can be prepared in a known manner by reacting the appropriate alcohols with the appropriate alkylene oxides. The derivatives of the fatty alcohols are particularly suitable, although the branched-chain isomers thereof, in particular so-called oxo alcohols, can also be used to produce alkoxylates that can be used. The alkoxylates, in particular the ethoxylates, of primary alcohols having linear radicals, in particular dodecyl, tetradecyl, hexadecyl or octadecyl radicals, as well as mixtures thereof, can therefore be used. Corresponding alkoxylation products of alkylamines, vicinal diols and carboxylic acid amides, which correspond to the aforementioned alcohols in terms of the alkyl moiety, can also be used. Also suitable are the ethylene oxide and/or propylene oxide insertion products of fatty acid alkyl esters, as well as fatty acid polyhydroxyamides. So-called alkylpolyglycosides which are suitable for incorporation in the products according to the invention are compounds of general formula $(G)_n$-$OR^{12}$, in which $R^{12}$ is an alkyl or alkenyl radical having 8 to 22 C atoms, G is a glycose unit, and n is a number between 1 and 10. The glycoside component $(G)_n$ refers to oligomers or polymers of naturally occurring aldose or ketose monomers, which in particular include glucose, mannose, fructose, galactose, talose, gulose, altrose, allose, idose, ribose, arabinose, xylose and lyxose. The oligomers consisting of such glycosidically linked monomers are characterized not only by the type of sugars contained therein but also by the number thereof, the so-called degree of oligomerization. As a parameter to be determined analytically, the degree of oligomerization n generally assumes fractional numerical values; it takes values between 1 and 10, and in the glycosides used with preference it has a value of less than 1.5, in particular between 1.2 and 1.4. Because of its good availability, glucose is a preferred monomer building block. The alkyl or alkenyl moiety $R^{12}$ of the glycosides likewise preferably originates from easily accessible derivatives of renewable raw materials, in particular from fatty alcohols, although the branched-chain isomers thereof, in particular so-called oxo alcohols, can also be used to produce glycosides that can be used. Use can therefore be made in particular of primary alcohols having linear octyl, decyl, dodecyl, tetradecyl, hexadecyl or octadecyl radicals, as well as mixtures thereof. Particularly preferred alkylglycosides contain a coconut fatty alkyl radical, that is to say mixtures where essentially $R^{12}$=dodecyl and $R^{12}$=tetradecyl.

In products which contain an active ingredient used according to the invention or which are used in the context of the use according to the invention, nonionic surfactant is contained preferably in amounts of 1% by weight to 30% by weight, in particular 1% by weight to 25% by weight, wherein amounts in the upper part of this range tend to be found in liquid detergents, and detergents in particle form preferably contain rather smaller amounts of up to 5% by weight.

The products may contain, instead or in addition, further surfactants, preferably synthetic anionic surfactants of the sulfate or sulfonate type. As synthetic anionic surfactants which are particularly suitable for use in such products, mention may be made, in addition to the aforementioned alkylbenzene sulfonates, of the alkyl and/or alkenyl sulfates having 8 to 22 C atoms which carry an alkali metal, ammonium or alkyl-substituted or hydroxyalkyl-substituted ammonium ion as counter-cation. Preference is given to the derivatives of fatty alcohols having in particular 12 to 18 C atoms and to the branched-chain analogs thereof, the so-called oxo alcohols. The alkyl and alkenyl sulfates can be prepared in a known manner by reacting the corresponding alcohol component with a customary sulfation reagent, in particular sulfur trioxide or chlorosulfonic acid, and then neutralizing with alkali metal, ammonium or alkyl-substituted or hydroxyalkyl-substituted ammonium bases. The surfactants of the sulfate type which can be used also include the sulfated alkoxylation products of the aforementioned alcohols, so-called ether sulfates. Such ether sulfates preferably contain 2 to 30, in particular 4 to 10, ethylene glycol groups per molecule. The suitable anionic surfactants of the sulfonate type include the α-sulfo esters obtainable by reacting fatty acid esters with sulfur trioxide and then neutralizing, in particular the sulfonation products derived from fatty acids having 8 to 22 C atoms, preferably 12 to 18 C atoms, and linear alcohols having 1 to 6 C atoms, preferably 1 to 4 C atoms, as well as the sulfo fatty acids resulting from formal saponification thereof. Preferred anionic surfactants are also the salts of sulfosuccinic acid esters, which are also known as alkyl sulfosuccinates or dialkyl sulfosuccinates, and the monoesters or diesters of sulfosuccinic acid with alcohols, preferably fatty alcohols and in particular ethoxylated fatty alcohols. Preferred sulfosuccinates contain $C_8$-$C_{18}$ fatty alcohol radicals or mixtures thereof. Particularly preferred sulfosuccinates contain an ethoxylated fatty alcohol radical, which is per se a nonionic surfactant. Particular preference is in turn given to sulfosuccinates in which the fatty alcohol radicals are derived from ethoxylated fatty alcohols having a narrow homolog distribution.

Other optional surfactant ingredients which are suitable are soaps, suitable soaps being saturated fatty acid soaps, such as the salts of lauric acid, myristic acid, palmitic acid or stearic acid, as well as soaps derived from natural fatty acid mixtures, for example coconut, palm kernel or tallow fatty acids. Particular preference is given to those soap mixtures which are composed of 50 to 100% by weight of saturated $C_{12}$-$C_{18}$ fatty acid soaps and up to 50% by weight of oleic acid soap. Preferably, soap is contained in amounts of 0.1% by weight to 5% by weight. Particularly in liquid products which contain an active ingredient used according to the invention, however, higher amounts of soaps of generally up to 20% by weight may also be contained.

If desired, the products may also contain betaine surfactants and/or cationic surfactants which, if present, are preferably used in amounts of 0.5% by weight to 7% by weight. Among these, particular preference is given to the esterquats discussed below.

If desired, the products may contain peroxygen-based bleaching agents, in particular in amounts in the range from 5% by weight to 70% by weight, and optionally bleach activator, in particular in amounts in the range from 2% by weight to 10% by weight. The bleaching agents which are suitable are preferably the peroxygen compounds generally used in detergents, such as percarboxylic acids, for example dodecanediperoic acid or phthaloylaminoperoxicaproic acid, hydrogen peroxide, alkali metal perborate, which may be in tetrahydrate or monohydrate form, percarbonate, perpyrophosphate and persilicate, which are generally in the form of alkali metal salts, in particular sodium salts. In detergents which contain an active ingredient used according to the invention, such bleaching agents are contained preferably in amounts up to 25% by weight, in particular up to 15% by weight and particularly preferably from 5% by weight to 15% by weight, in each case based on the total product, percarbonate being used in particular. The optionally present component of the bleach activators comprises the commonly used N- or O-acyl compounds, for example polyacylated alkylenediamines, in particular tetraacetylethylenediamine, acylated glycolurils, in particular tetraacetyl glycoluril, N-acylated hydantoins, hydrazides, triazoles, urazoles, diketopiperazines, sulfurylamides and cyanurates, also carboxylic acid anhydrides, in particular phthalic anhydride, carboxylic acid esters, in particular sodium isononanoyl phenolsulfonate, and acylated sugar derivatives, in particular pentaacetyl glucose, as well as cationic nitrile derivatives such as trimethylammonium acetonitrile salts. The bleach activators may have been granulated and/or coated in a known manner with coating substances in order to avoid interaction with the percompounds during storage, particular preference being given to carboxymethylcellulose-granulated tetraacetylethylenediamine having mean grain sizes of 0.01 mm to 0.8 mm, granulated 1,5-diacetyl-2,4-dioxohexahydro-1,3,5-triazine, and/or trialkylammonium acetonitrile prepared in particle form. In detergents, such bleach activators are preferably contained in amounts up to 8% by weight, in particular from 2% by weight to 6% by weight, in each case based on the total product.

In a further embodiment, the product contains water-soluble and/or water-insoluble builders, in particular selected from alkali metal aluminosilicate, crystalline alkali silicate having a modulus greater than 1, monomeric polycarboxylate, polymeric polycarboxylate, and mixtures thereof, in particular in amounts in the range from 2.5% by weight to 60% by weight.

The product preferably contains 20% by weight to 55% by weight of water-soluble and/or water-insoluble, organic and/or inorganic builders. The water-soluble organic builder substances include in particular those from the class of polycarboxylic acids, in particular citric acid and sugar acids, as well as the polymeric (poly)carboxylic acids, in particular the polycarboxylates obtainable by oxidation of polysaccharides, polymeric acrylic acids, methacrylic acids, maleic acids, and mixed polymers thereof, which may also contain, copolymerized therein, small amounts of polymerizable substances without carboxylic acid functionality. The relative molecular mass of the homopolymers of unsaturated carboxylic acids is generally between 5000 g/mol and 200,000 g/mol, and that of the copolymers is between 2000 g/mol and 200,000 g/mol, preferably 50,000 g/mol to 120,000 g/mol, based on free acid. A particularly preferred acrylic acid-maleic acid copolymer has a relative molecular mass of 50,000 g/mol to 100,000 g/mol. Suitable, although less preferred, compounds of this class are copolymers of acrylic acid or methacrylic acid with vinyl ethers, such as vinyl methyl ethers, vinyl esters, ethylene, propylene and styrene, in which the proportion of the acid is at least 50% by weight. As water-soluble organic builder substances, use can also be made of terpolymers which contain as monomers two carboxylic acids and/or salts thereof and, as a third monomer, vinyl alcohol and/or a vinyl alcohol derivative or a carbohydrate. The first acidic monomer or salt thereof is derived from a monoethylenically unsaturated $C_3$-$C_8$ carboxylic acid and preferably from a $C_3$-$C_4$ monocarboxylic acid, in particular from (meth)acrylic acid. The second acidic monomer or salt thereof may be a derivative of a $C_4$-$C_8$ dicarboxylic acid, particular preference being given to maleic acid. The third monomeric unit is in this case formed by vinyl alcohol and/or preferably an esterified vinyl alcohol. Particular preference is given to vinyl alcohol derivatives which are an ester of short-chain carboxylic acids, for example of $C_1$-$C_4$ carboxylic acids, with vinyl alcohol. Preferred terpolymers contain 60% by weight to 95% by weight, in particular 70% by weight to 90% by weight, of (meth)acrylic acid and/or (meth)acrylate, particularly preferably acrylic acid and/or acrylate, and maleic acid and/or maleinate, and 5% by weight to 40% by weight, preferably 10% by weight to 30% by weight, of vinyl alcohol and/or vinyl acetate. Very particular preference is given to terpolymers in which the weight ratio of (meth)acrylic acid and/or (meth)acrylate to maleic acid and/or maleate is between 1:1 and 4:1, preferably between 2:1 and 3:1 and in particular 2:1 and 2.5:1. Both the amounts and the weight ratios are based on the acids. The second acidic monomer or salt thereof may also be a derivative of an allylsulfonic acid which is substituted in the 2-position by an alkyl radical, preferably by a $C_1$-$C_4$ alkyl radical, or by an aromatic radical which is preferably derived from benzene or benzene derivatives. Preferred terpolymers contain 40% by weight to 60% by weight, in particular 45 to 55% by weight, of (meth)acrylic acid and/or (meth)acrylate, particularly preferably acrylic acid and/or acrylate, 10% by weight to 30% by weight, preferably 15% by weight to 25% by weight, of methallylsulfonic acid and/or methallyl sulfonate, and as a third monomer 15% by weight to 40% by weight, preferably 20% by weight to 40% by weight, of a carbohydrate. This carbohydrate may be for example a mono-, di-, oligo- or polysaccharide, preference being given to mono-, di- or oligosaccharides, and particular preference being given to sucrose. By using the third monomer, it is assumed that predetermined breakage sites are formed in the polymer, which are responsible for the good biodegradability of the polymer. These terpolymers generally have a relative molecular mass between 1000 g/mol and 200,000 g/mol, preferably between 2000 g/mol and 50,000 g/mol, and in particular between 3000 g/mol and 10,000 g/mol. Particularly for producing liquid products, they can be used in the form of aqueous solutions, preferably in the form of 30 to 50% by weight aqueous solutions. All the aforementioned polycarboxylic acids are generally used in the form of the water-soluble salts thereof, in particular the alkali metal salts thereof.

Such organic builder substances are preferably contained in amounts of up to 40% by weight, in particular up to 25% by weight and particularly preferably from 1% by weight to 5% by weight. Amounts close to the aforementioned upper limit are preferably used in pasty or liquid, in particular water-containing, products.

As water-insoluble, water-dispersible inorganic builder materials, use is made in particular of crystalline or amorphous alkali metal aluminosilicates, in amounts of up to 50% by weight, preferably not more than 40% by weight, and in liquid products in particular from 1% by weight to 5% by weight. Among these, preference is given to the crystalline aluminosilicates in detergent quality, in particular zeolite NaA and possibly NaX. Amounts close to the aforementioned upper limit are preferably used in solid, particulate products. Suitable aluminosilicates have in particular no particles having a grain size greater than 30 μm and preferably consist of at least 80% by weight of particles having a size less than 10 μm. Their calcium binding capacity lies in the range from 100 to 200 mg CaO per gram. Suitable substitutes or partial substitutes for said aluminosilicate are crystalline alkali metal silicates, which may be present alone or in a mixture with amorphous silicates. The alkali metal silicates which can be used as builders in the products preferably have a molar ratio of alkali metal oxide to $SiO_2$ below 0.95, in particular from 1:1.1 to 1:12, and may be in amorphous or crystalline form. Preferred alkali metal silicates are the sodium silicates, in particular the amorphous sodium silicates, with a molar ratio of $Na_2O$:$SiO_2$ of 1:2 to 1:2.8. Such amorphous alkali metal silicates are commercially available for example under the name Portil®. Those having a molar ratio $Na_2O$:$SiO_2$ of 1:1.9 to 1:2.8 are preferably added as a solid in the course of the preparation and not in the form of a solution. As crystalline silicates which may be present alone or in a mixture with amorphous silicates, use is preferably made of crystalline phyllosilicates of general formula $Na_2SixO_{2x+1}.yH_2O$, in which x, the so-called modulus, is a number from 1.9 to 4 and y is a number from 0 to 20 and preferred values for x are 2, 3 or 4. Crystalline phyllosilicates which fall under this general formula are described for example in European patent application EP 0 164 514. Preferred crystalline phyllosilicates are those in which x in the aforementioned general formula assumes the value 2 or 3. In particular, preference is given to both β- and δ-sodium disilicates ($Na_2Si_2O_5.yH_2O$). In products which contain an active ingredient to be used according to the invention, use can also be made of crystalline alkali metal silicates of the aforementioned general formula, in which x is a number from 1.9 to 2.1, which are prepared from amorphous alkali metal silicates and are virtually anhydrous. In a further preferred embodiment of products according to the invention, use is made of a crystalline sodium phyllosilicate having a modulus of 2 to 3, as can be prepared from sand and soda. In a further preferred embodiment of detergents which contain an active ingredient used according to the invention, use is made of crystalline sodium silicates having a modulus in the range from 1.9 to 3.5. The content of alkali metal silicates therein is preferably 1% by weight to 50% by weight and in particular 5% by weight to 35% by weight, based on anhydrous active substance. If alkali metal aluminosilicate, in particular zeolite, is also present as an additional builder substance, the content of alkali metal silicate is preferably 1% by weight to 15% by weight and in particular 2% by weight to 8% by weight, based on anhydrous active substance. The weight ratio of aluminosilicate to silicate, in each case based on anhydrous active substances, is then preferably 4:1 to 10:1. In products which contain both amorphous and crystalline alkali metal silicates, the weight ratio of amorphous alkali metal silicate to crystalline alkali metal silicate is preferably 1:2 to 2:1 and in particular 1:1 to 2:1.

In addition to the aforementioned inorganic builder, further water-soluble or water-insoluble inorganic substances may be contained in the products which contain an active ingredient to be used according to the invention or which are used together therewith or which are used in methods according to the invention. Suitable in this context are the alkali metal carbonates, alkali metal hydrogen carbonates and alkali metal sulfates, and mixtures thereof. Such additional inorganic material may be present in amounts of up to 70% by weight.

The products may additionally contain further constituents customary in detergents or cleaning products. These optional constituents include in particular enzymes, enzyme stabilizers, complexing agents for heavy metals, for example aminopolycarboxylic acids, aminohydroxypolycarboxylic acids, polyphosphonic acids and/or aminopolyphosphonic acids, foam inhibitors, for example organopolysiloxanes or paraffins, solvents and optical brighteners, for example stilbenedisulfonic acid derivatives. Products which contain an active ingredient used according to the invention preferably contain up to 1% by weight, in particular 0.01% by weight to 0.5% by weight, of optical brighteners, in particular compounds from the class of the substituted 4,4'-bis-(2,4,6-triamino-s-triazinyl)stilbene-2,2'-disulfonic acids, up to 5% by weight, in particular 0.1% by weight to 2% by weight, of complexing agents for heavy metals, in particular aminoalkylenephosphonic acids and salts thereof, and up to 2% by weight, in particular 0.1% by weight to 1% by weight, of foam inhibitors, the aforementioned proportions by weight being based in each case on the total product.

Solvents which can be used in particular in the case of liquid products are, besides water, preferably those which are water-miscible. These include the lower alcohols, for example ethanol, propanol, isopropanol, and the isomeric butanols, glycerol, lower glycols, for example ethylene glycol and propylene glycol, and the ethers which can be derived from the aforementioned compound classes. In such liquid products, the active ingredients used according to the invention are generally present in dissolved or suspended form.

Optionally present enzymes are preferably selected from the group comprising protease, amylase, lipase, cellulase, hemicellulase, oxidase, peroxidase, pectinase, and mixtures thereof. Protease obtained from microorganisms, such as bacteria or fungi, is particularly suitable. It can be obtained from suitable microorganisms in a known manner by fermentation processes. Proteases are commercially available for example under the names BLAP®, Savinase®, Esperase®, Maxatase®, Optimase®, Alcalase®, Durazym® or Maxapem®. The lipase which can be used can be obtained for example from *Humicola lanuginosa*, from *Bacillus* species, from *Pseudomonas* species, from *Fusarium* species, from *Rhizopus* species or from *Aspergillus* species. Suitable lipases are commercially available for example under the names Lipolase®, Lipozym®, Lipomax®, Lipex®, Amano® lipase, Toyo-Jozo® lipase, Meito® lipase and Diosynth® lipase. Suitable amylases are commercially available for example under the names Maxamyl®, Termamyl®, Duramyl® and Purafect® OxAm. The cellulase which can be used may be an enzyme which can be obtained from bacteria or fungi and has a pH optimum preferably in the weakly acidic to weakly alkaline range of 6 to 9.5. Such cellulases are commercially available under the names Celluzyme®, Carezyme® and Ecostone®. Suitable pectinases are available for example under the names Gamanase®, Pektinex AR®, X-Pect® or Pectaway® from Novozymes, under the name Rohapect UF®, Rohapect TPL®, Rohapect PTE100®, Rohapect MPE®, Rohapect MA plus HC, Rohapect DA12L®, Rohapect 10L®, Rohapect B1L® from AB Enzymes, and under the name Pyrolase® from Diversa Corp., San Diego, Calif., USA.

The customary enzyme stabilizers which may optionally be present, particularly in liquid products, include amino alcohols, for example mono-, di-, triethanol- and -propanolamine and mixtures thereof, lower carboxylic acids, boric acid, alkali metal borates, boric acid-carboxylic acid combinations, boric acid esters, boronic acid derivatives, calcium salts, for example Ca-formic acid combination, magnesium salts, and/or sulfur-containing reducing agents.

Suitable foam inhibitors include long-chain soaps, in particular behenic soap, fatty acid amides, paraffins, waxes, microcrystalline waxes, organopolysiloxanes, and mixtures thereof, which may additionally contain microfine, optionally silanized or otherwise hydrophobicized silicic acid. For use in particulate products, such foam inhibitors are preferably bound to granular, water-soluble carrier substances.

The known polyester-active soil release polymers which can be used in addition to the active ingredients essential to the invention include copolyesters of dicarboxylic acids, for example adipic acid, phthalic acid or terephthalic acid, diols, for example ethylene glycol or propylene glycol, and polydiols, for example polyethylene glycol or polypropylene glycol. The soil release polyesters used with preference include those compounds which can be obtained by esterifying two monomer parts, wherein the first monomer is a dicarboxylic acid HOOC-Ph-COOH and the second monomer is a diol $HO—(CHR^{11}—)_aOH$, which may also be in the form of a polymeric diol $H—(O—(CHR^{11}—)_a)_bOH$. Here, Ph denotes an o-, m- or p-phenylene radical which can carry 1 to 4 substituents selected from alkyl radicals having 1 to 22 C atoms, sulfonic acid groups, carboxyl groups, and mixtures thereof, $R^{11}$ denotes hydrogen, an alkyl radical having 1 to 22 C atoms, and mixtures thereof, a denotes a number from 2 to 6, and b denotes a number from 1 to 300. The polyesters obtainable therefrom preferably contain both monomer diol units $—O—(CHR^{11}—)_aO—$ and polymer diol units $—(O—(CHR^{11}—)_a)_bO—$. The molar ratio of monomer diol units to polymer diol units is preferably 100:1 to 1:100, in particular 10:1 to 1:10. In the polymer diol units, the degree of polymerization b preferably lies in the range from 4 to 200, in particular from 12 to 140. The molecular weight or the average molecular weight or the maximum of the molecular weight distribution of preferred soil release polyesters lies in the range from 250 g/mol to 100,000 g/mol, in particular from 500 g/mol to 50,000 g/mol. The acid on which the radical Ph is based is preferably selected from terephthalic acid, isophthalic acid, phthalic acid, trimellitic acid, mellitic acid, the isomers of sulfophthalic acid, sulfoisophthalic acid and sulfoterephthalic acid, and mixtures thereof. If the acid groups thereof are not part of the ester bonds in the polymer, they are preferably in the form of a salt, in particular in the form of an alkali metal or ammonium salt. Among these, particular preference is given to the sodium and potassium salts. If desired, instead of the monomer HOOC-Ph-COOH, small amounts, in particular not more than 10 mol %, based on the proportion of Ph having the meaning given above, of other acids having at least two carboxyl groups may be contained in the soil release polyester. These include for example alkylene- and alkenylenedicarboxylic acids, such as malonic acid, succinic acid, fumaric acid, maleic acid, glutaric acid, adipic acid, pimelic acid, suberic acid, azelaic acid and sebacic acid. Preferred diols $HO—(CHR^{11}—)_aOH$ include those in which $R^{11}$ is hydrogen and a is a number from 2 to 6, and those in which a has the value 2 and $R^{11}$ is selected from hydrogen and alkyl radicals having 1 to 10 C atoms, in particular 1 to 3 C atoms. Among the last-mentioned diols, particular preference is given to those of formula HO—$CH_2$—$CHR^{11}$—OH, in which $R^{11}$ has the aforementioned meaning. Examples of diol components are ethylene glycol, 1,2-propylene glycol, 1,3-propylene glycol, 1,4-butanediol, 1,5-pentanediol, 1,6-hexanediol, 1,8-octanediol, 1,2-decanediol, 1,2-dodecanediol and neopentyl glycol. Among the polymeric diols, particular preference is given to polyethylene glycol having an average molar mass in the range from 1000 g/mol to 6000 g/mol. If desired, these polyesters of the composition described above may also be capped by end groups, suitable end groups being alkyl groups having 1 to 22 C atoms and esters of monocarboxylic acids. The end groups bound via ester bonds may be based on alkyl-, alkenyl- and arylmonocarboxylic acids having 5 to 32 C atoms, in particular 5 to 18 C atoms. These include valeric acid, caproic acid, enanthic acid, caprylic acid, pelargonic acid, capric acid, undecanoic acid, undecenoic acid, lauric acid, lauroleic acid, tridecanoic acid, myristic acid, myristoleic acid, pentadecanoic acid, palmitic acid, stearic acid, petroselic acid, petroselaidic acid, oleic acid, linoleic acid, linolaidic acid, linolenic acid, eleostearic acid, arachidic acid, gadoleic acid, arachidonic acid, behenic acid, erucic acid, brassidic acid, clupanodonic acid, lignoceric acid, cerotinic acid, melissic acid, benzoic acid, which can carry 1 to 5 substituents having in total up to 25 C atoms, in particular 1 to 12 C atoms, for example tert-butylbenzoic acid. The end groups may also be based on hydroxymonocarboxylic acids having 5 to 22 C atoms, including for example hydroxyvaleric acid, hydroxycaproic acid, ricinoleic acid, the hydrogenation product thereof hydroxystearic acid, and o-, m- and p-hydroxybenzoic acid. The hydroxymonocarboxylic acids may for their part be bonded to one another via their hydroxyl group and their carboxyl group and thus are present in multiple in an end group. The number of hydroxymonocarboxylic acid units per end group, that is to say the degree of oligomerization thereof, preferably lies in the range from 1 to 50, in particular from 1 to 10. In one preferred embodiment of the invention, use is made of polymers of ethylene terephthalate and polyethylene oxide terephthalate, in which the polyethylene glycol units have molecular weights of 750 g/mol to 5000 g/mol and the molar ratio of ethylene terephthalate to polyethylene oxide terephthalate is 50:50 to 90:10, in combination with an active ingredient essential to the invention.

The soil release polymers are preferably water-soluble, the term "water-soluble" being understood to mean a solubility of at least 0.01 g, preferably at least 0.1 g, of the polymer per liter of water at room temperature and pH 8. However, under these conditions, polymers which are preferably used have a solubility of at least 1 g per liter, in particular at least 10 g per liter.

The preparation of solid products according to the invention presents no difficulties and can take place in a known manner, for example by spray drying or granulation, wherein enzymes and any further heat-sensitive ingredients, such as bleaching agents for example, are added separately later if required. For the preparation of products according to the invention having an increased bulk density, in particular in the range from 650 g/l to 950 g/l, preference is given to a method which includes an extrusion step.

To prepare products according to the invention in tablet form, which may be single-phase or multiphase, single-colored or multicolored and in particular may consist of one layer or of multiple layers, in particular of two layers, the procedure is preferably such that all constituents, where appropriate for one layer, are mixed with one another in a mixer and the mixture is compressed with pressing forces in the range from around 50 to 100 kN, preferably 60 to 70 kN, by means of conventional tablet presses, for example eccentric presses or rotary presses. Particularly in the case of multilayer tablets, it may be advantageous if at least one layer is pre-pressed. This is preferably carried out at pressing forces between 5 and 20 kN, in particular 10 to 15 kN. In this way, tablets are easily obtained which are resistant to breaking and which nevertheless are sufficiently rapidly soluble under use conditions, having breaking and bending strengths of normally 100 to 200 N, but preferably above 150 N. A tablet produced in this way preferably has a weight of 10 g to 50 g, in particular 15 g to 40 g. The shape of the tablets is arbitrary and may be round, oval or angular, although intermediate shapes are also possible. Corners and edges are advantageously rounded. Round tablets preferably have a diameter of 30 mm to 40 mm. In particular, the size of rectangular or square tablets, which are introduced predominantly by way of the dosing device for example of the dishwasher, depends on the geometry and the volume of said dosing device. Embodiments which are preferred by way of example have a base area of (20 to 30 mm)×(34 to 40 mm), in particular of 26×36 mm or 24×38 mm.

Liquid or pasty products according to the invention in the form of solutions containing customary solvents, in particular water, are generally prepared by simply mixing the ingredients, which may be added in substance form or as a solution into an automatic mixer.

In one preferred embodiment, a product into which the active ingredient to be used according to the invention is incorporated is liquid and contains 1% by weight to 15% by weight, in particular 2% by weight to 10% by weight, of nonionic surfactant, 2% by weight to 30% by weight, in particular 5% by weight to 20% by weight, of synthetic anionic surfactant, up to 15% by weight, in particular 2% by weight to 12.5% by weight, of soap, 0.5% by weight to 5% by weight, in particular 1% by weight to 4% by weight, of organic builders, in particular polycarboxylate such as citrate, up to 1.5% by weight, in particular 0.1% by weight to 1% by weight, of complexing agent for heavy metals, such as phosphonate, and, besides the optionally contained enzyme, enzyme stabilizer, colorant and/or perfume, also water and/or water-miscible solvent.

In a further preferred embodiment, a product into which the active ingredient to be used according to the invention is incorporated is particulate and contains up to 25% by weight, in particular 5% by weight to 20% by weight, of bleaching agent, in particular alkali metal percarbonate, up to 15% by weight, in particular 1% by weight to 10% by weight, of bleach activator, 20% by weight to 55% by weight of inorganic builder, up to 10% by weight, in particular 2% by weight to 8% by weight, of water-soluble organic builder, 10% by weight to 25% by weight of synthetic anionic surfactant, 1% by weight to 5% by weight of nonionic surfactant, and up to 25% by weight, in particular 0.1% by weight to 25% by weight, of inorganic salts, in particular alkali metal carbonate and/or alkali metal hydrogen carbonate.

EXAMPLES

Example 1: Polymer Preparation

The amounts of 3-((2-(methacryloxy)ethyl)-N,N-dimethylammonio)propane-1-sulfonate (sulfobetaine) and of 2-hydroxyethyl methacrylate (HEMA) specified in Table 1 were weighed into a Schlenk flask along with 150 ml of ethanol (70% by volume in water). 300 mg to 500 mg of 4,4'-azobis-(4-cyanovaleric acid) were added to the batches intended for the preparation of lower-molecular-weight polymers V1, V3 and V5 and 4 mg of 4,4'-azobis-(4-cyanovaleric acid) were added to the batches intended for the preparation of higher-molecular-weight polymers V2, V4 and V6, and each batch was flushed with nitrogen for 30 minutes, then the batches were stirred at 65° C. After 15 h, a further 4 mg of 4,4'-azobis-(4-cyanovaleric acid) were added to the batches intended for the preparation of higher-molecular-weight polymers V2, V4 and V6. In all batches, polymerization was carried out for a total duration of 48 hours in each case. The mixture was then diluted with 1000 ml of water and the resulting polymer was isolated by freeze-drying.

The following variants of poly(2-hydroxyethylmethacrylate-co-N-(2-(methacryloxyethyl)-N,N-dimethyl-N-(3-sulfopropyl)ammonium betaine) having the average molar masses and molar ratios of sulfobetaine to HEMA as specified in Table 1 for the resulting polymers were synthesized in this way:

| Polymer | Amount of sulfobetaine | Amount of HEMA | Molar mass | Molar ratio |
|---|---|---|---|---|
| V1 | 13 g | 2 g | 5000 g/mol | 75:25 |
| V2 | 13 g | 2 g | 50,000 g/mol | 75:25 |
| V3 | 10.2 g | 4.8 g | 5000 g/mol | 50:50 |
| V4 | 10.2 g | 4.8 g | 50,000 g/mol | 50:50 |
| V5 | 6.3 g | 8.7 g | 5000 g/mol | 25:75 |
| V6 | 6.3 g | 8.7 g | 50,000 g/mol | 25:75 |

Example 2

TABLE 2

Detergent compositions (in % by weight)

| | A | B | C | D | E | F | G | H |
|---|---|---|---|---|---|---|---|---|
| $C_{9-13}$ alkylbenzene sulfonate, Na salt | 9 | 10 | 6 | 7 | 5 | 15 | 15 | 9 |
| $C_{12-18}$ fatty alcohol with 7 EO | 8 | 9 | 6 | 7 | 5 | 6 | 11 | 10 |
| $C_{12-14}$ fatty alcohol sulfate with 2 EO | – | – | 8 | 7 | 10 | 2 | 2 | 5 |
| $C_{12-18}$ fatty acid, Na salt | 4 | 3 | 3 | 3 | 4 | 2 | 4 | 7 |
| Citric acid | 2 | 3 | 3 | 2 | 2 | 2 | 2 | 3 |
| Sodium hydroxide, 50% | 3 | 3 | 2 | 3 | 3 | 3 | 3 | 4 |
| Boric acid | 1 | 1 | 1 | 1 | 1 | 1 | 1 | 1 |
| Enzyme (amylase, protease, cellulase) | + | + | + | + | + | + | + | + |
| Perfume | 1 | 0.5 | 0.5 | 1 | 1 | 1 | 1 | 1 |
| Glycerol | 0 | 2 | 2 | 2 | 2 | – | – | 2 |
| Propanediol | – | – | – | – | – | 5 | 5 | – |
| Ethanol | 1.5 | 1.5 | 1.5 | 1.5 | 1.5 | 1.5 | 1.5 | 5 |
| PVA-maleic acid copolymer | 0.1 | – | 0.1 | – | – | – | – | – |
| Optical brightener | – | 0.1 | – | 0.1 | 0.2 | 0.2 | 0.2 | 0.2 |
| Alkylaminophosphonic acid | 0.5 | 0.5 | 0.5 | 0.5 | 0.5 | 0.5 | 0.5 | 0.5 |
| Polymer essential to the invention | 2 | 2 | 2 | 2 | 2 | 2 | 2 | 2 |
| Water | ad 100 | | | | | | | |

Example 3: Washing Tests

Test textiles made of cotton which had been provided with standardized soiling (A: C-01, carbon black/mineral oil, available from Center for Test Materials BV, B: 10D, pigment/sebum, available from wfk Testgewebe GmbH) were washed for 1 hour at 25° C. using the detergent C indicated in Example 2 containing in each case one polymer V1 to V6 prepared in Example 1 or, for comparison purposes, the commercially available cocoamidopropylbetaine Tegobetain® C60 (available from Evonik Industries AG) (V7) with a dosage of the detergent of in each case 4.2 g/l. After rinsing the test textiles with water and hang-drying, the degree of whiteness thereof was determined by spectrophotometry (Minolta® CR400-1). In Table 3 below, the differences in the remission values (in each case in %) for the same use of the otherwise identically composed detergent without the polymer are given as mean values from 5 determinations.

TABLE 3

Washing results (remission difference)

| | soiling | |
|---|---|---|
| Polymer | A | B |
| V1 | 0.5 | 0.7 |
| V2 | 1.0 | 0.7 |
| V3 | 0.5 | 4.1 |
| V4 | 1.1 | 1.8 |
| V5 | n.d. | 3.3 |
| V6 | 2.3 | 3.4 |
| V7 | 0.5 | 0.2 |

n.d.: not determined

The detergents containing the active ingredients to be used according to the invention exhibited a significantly better primary detergent performance than a product of otherwise identical composition which lacked said active ingredient, or a product which contained a different betaine.

What is claimed is:

1. A detergent or cleaning product containing a polymer obtainable by copolymerization of: (A) 2-hydroxyethyl methacrylate, with (B) N-(2-(methacryloxyethyl)-N,N-dimethyl-N-(3-sulfopropyl)ammonium betaine, and wherein the molar ratio of A to B is from 75:25 to 25:75, wherein the detergent or cleaning product further comprises alkylbenzene sulfonate having linear $C_{9-13}$ alkyl groups and wherein the weight ratio of linear alkylbenzene sulfonate to polymer consisting of the units A and B lies in the range from 8:1 to 2:1.

2. The detergent or cleaning product according to claim 1, wherein the polymer consisting of the units A and B has an average molecular weight in the range from 2000 g/mol to 100,000 g/mol.

3. The product according to claim 1, wherein it contains 0.1% by weight to 10% by weight, of polymer consisting of the units A and B.

4. A method for removing soiling from textiles or hard surfaces comprising the step of bringing the textile or the hard surface into contact with an aqueous liquor which comprises a detergent or cleaning product according to claim 1.

5. The method according to claim 4, wherein the concentration of polymer consisting of the units A and B in the liquor lies in the range from 0.01 g/l to 0.5 g/l.

* * * * *